United States Patent
Yuan et al.

(10) Patent No.: US 12,408,122 B2
(45) Date of Patent: Sep. 2, 2025

(54) POWER REBALANCING IN A MAXIMUM PERMISSIBLE EXPOSURE EVENT

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 463 days.

(21) Appl. No.: 17/758,070

(22) PCT Filed: Jan. 27, 2021

(86) PCT No.: PCT/CN2021/073943
§ 371 (c)(1),
(2) Date: Jun. 27, 2022

(87) PCT Pub. No.: WO2021/164513
PCT Pub. Date: Aug. 26, 2021

(65) Prior Publication Data
US 2023/0035862 A1  Feb. 2, 2023

(30) Foreign Application Priority Data
Feb. 21, 2020 (WO) ................ PCT/CN2020/076220

(51) Int. Cl.
*H04W 52/36* (2009.01)
*H04W 72/1263* (2023.01)
(Continued)

(52) U.S. Cl.
CPC ..... *H04W 52/367* (2013.01); *H04W 72/1263* (2013.01); *H04W 72/21* (2023.01); *H04W 72/23* (2023.01)

(58) Field of Classification Search
CPC .......... H04W 52/367; H04W 72/1263; H04W 72/21; H04W 72/23; H04W 52/346;
(Continued)

(56) References Cited

U.S. PATENT DOCUMENTS 10,123,278 B2   11/2018   Ramkumar et al.
2018/0278318 A1   9/2018   Chakraborty et al.
(Continued)

FOREIGN PATENT DOCUMENTS

CN   102368869 A   3/2012
CN   102869080 A   1/2013
(Continued)

OTHER PUBLICATIONS

Electronic Translation for WO-2020192408. (Year: 2020).*
(Continued)

*Primary Examiner* — Marisol Figueroa
(74) *Attorney, Agent, or Firm* — ArentFox Schiff LLP

(57) ABSTRACT

An apparatus receives at least one scheduling grant scheduling transmission on a first data channel and further scheduling a second data channel. The apparatus reduces a transmit power for the transmission on the first data channel with a first beam when a radio frequency (RF) exposure event occurs. The apparatus increases, after the RF exposure event occurs, a transmit power for the transmission on the second data channel with a second beam. The apparatus transmits an RF exposure report associated with at least one of the first data channel or the first beam to the base station.

25 Claims, 11 Drawing Sheets

(51) Int. Cl.
*H04W 72/21* (2023.01)
*H04W 72/23* (2023.01)

(58) Field of Classification Search
CPC .. H04W 52/146; H04W 52/42; H04B 7/0691; H04B 7/0695
See application file for complete search history.

(56) References Cited

U.S. PATENT DOCUMENTS

2020/0021421 A1   1/2020   Han et al.
2020/0022093 A1   1/2020   Han et al.

FOREIGN PATENT DOCUMENTS

| CN | 107925969 | A | 4/2018 | | |
|---|---|---|---|---|---|
| CN | 108401284 | A | 8/2018 | | |
| CN | 109983808 | A | 7/2019 | | |
| CN | 110113810 | A | 8/2019 | | |
| CN | 110225575 | A | 9/2019 | | |
| WO | 2018089183 | | 5/2018 | | |
| WO | 2018228472 | A1 | 12/2018 | | |
| WO | WO-2020192408 | A1 * | 10/2020 | ........... | H04B 1/3827 |
| WO | WO-2021008710 | A1 * | 1/2021 | ........... | H04B 17/318 |

OTHER PUBLICATIONS

International Search Report and Written Opinion—PCT/CN2020/076220—ISA/EPO—Nov. 11, 2020.
International Search Report and Written Opinion—PCT/CN2021/073943—ISA/EPO—Apr. 15, 2021.
Supplementary European Search Report—21757334—Search Authority—The Hague—Feb. 14, 2024.

* cited by examiner

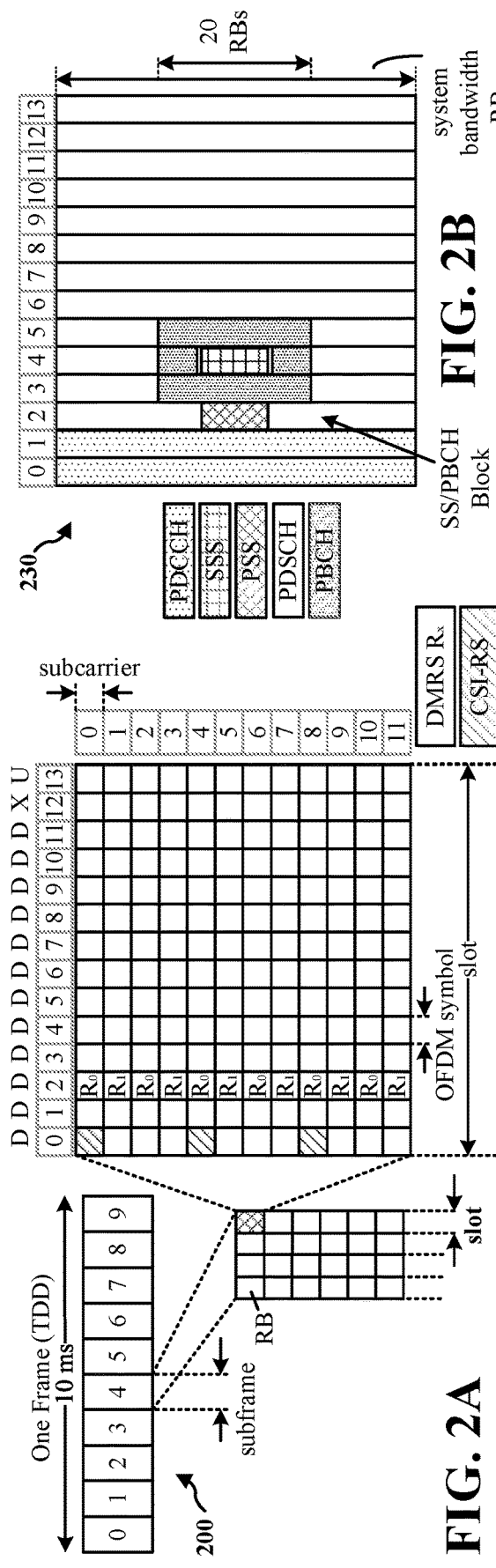
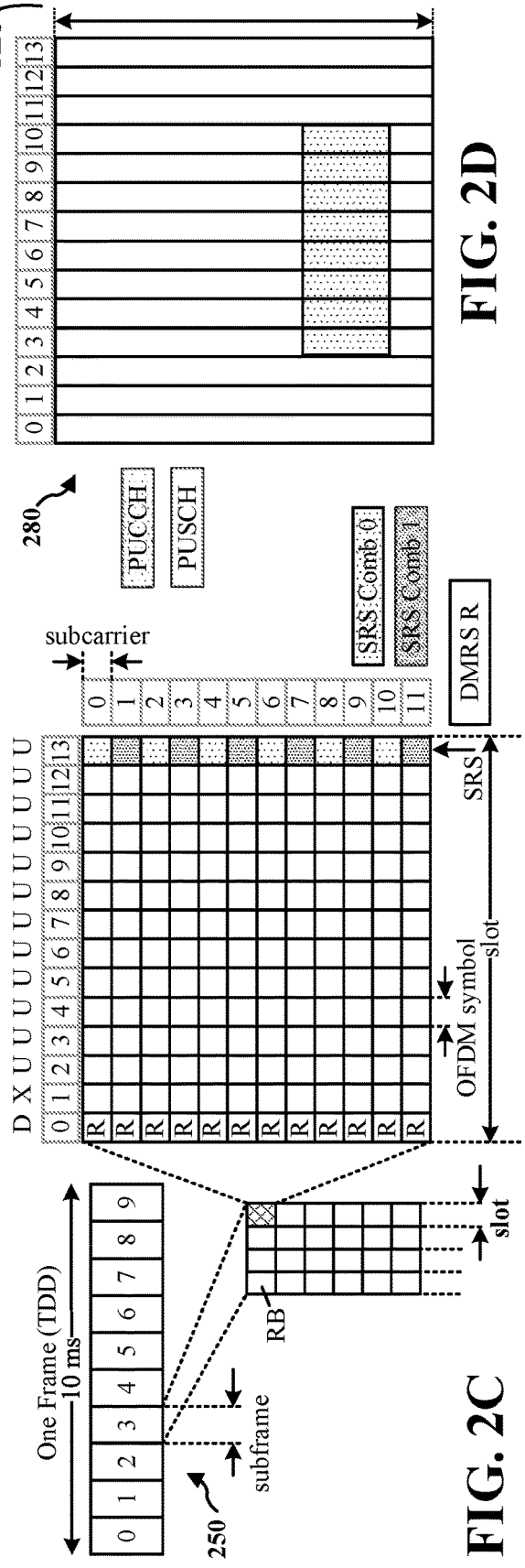

POWER REBALANCING IN A MAXIMUM PERMISSIBLE EXPOSURE EVENT

CROSS-REFERENCE TO RELATED APPLICATIONS

This application is a National Phase entry of PCT Application No. PCT/CN2021/073943, entitled "POWER REBALANCING IN A MAXIMUM PERMISSIBLE EXPOSURE EVENT" and filed on Jan. 27, 2021, which claims priority of PCT Application No. PCT/CN2020/076220, entitled "POWER REBALANCING IN A MAXIMUM PERMISSIBLE EXPOSURE EVENT" and filed on Feb. 21, 2020, both of which are expressly incorporated by reference herein in their entirety.

BACKGROUND

Technical Field

The present disclosure relates generally to communication systems, and more particularly, to a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment. The apparatus may receive, from a base station, at least one scheduling grant scheduling transmission on a first data channel and further scheduling transmission on a second data channel, reduce a transmit power for the transmission on the first data channel with a first beam when a radio frequency (RF) exposure event occurs, increase, after the RF exposure event occurs, a transmit power for the transmission on the second data channel with a second beam, and transmit an RF exposure report associated with at least one of the first data channel or the first beam to the base station.

In some aspects, the transmit power of the first data channel may be reduced by a power delta, and the transmit power of the second data channel may be increased by the power delta.

In some aspects, the power delta may be the entire transmit power for the first data channel.

In some aspects, uplink control information scheduled on the first data channel may be remapped to the second data channel.

In some aspects, uplink control information may be scheduled for uplink control information symbols of the first data channel, and the transmit power for the uplink control information symbols of the first data channel may not be reduced when the RF exposure event occurs.

In some aspects, the RF exposure report may be based on the reduction in transmit power for the first data channel.

In some aspects, the RF exposure report may be a media access control element (MAC-CE).

In some aspects, the RF exposure report may include an identifier of the amount of power reduction of the first data channel and an identifier of the first beam.

In some aspects, the RF exposure report may include an identifier of the first data channel.

In some aspects, the RF exposure report may include an identifier of the amount of power increase of the second data channel.

In some aspects, the RF exposure report includes a request for the second beam to be paired with a new beam.

In some aspects, the RF exposure report is transmitted to the base station on the second data channel using the second beam.

In another aspect of the disclosure, a method, a computer-readable medium, and an apparatus are provided. The apparatus may be a base station. The apparatus may transmit, to a user equipment (UE), at least one scheduling grant scheduling transmission on a first data channel and further scheduling transmission on a second data channel, receive, from the UE a radio frequency (RF) exposure report associated with the transmission on the first data channel, the RF exposure report being received on the second data channel, and refrain from scheduling another transmission on the first data channel in at least a portion of at least one slot when the RF exposure report is received.

In some aspects, the RF exposure report may be a media access control element (MAC-CE).

In some aspects, the RF exposure report may include an identifier of an amount of power reduction of the first data channel and an identifier of the first beam.

In some aspects, the RF exposure report may include an identifier of the first data channel.

In some aspects, the RF exposure report may include an identifier of an amount of power increase of the second data channel, and the apparatus may schedule the second data channel in the next slot based on the amount of power increase of the second data channel.

In some aspects, the RF exposure report may include a request for the second beam to be paired with a new beam, and the apparatus may transmit, to the UE, a scheduling grant scheduling the first data channel for a third beam.

In some aspects, the UE may be scheduled to transmit uplink control information on the first data channel, and the apparatus may receive the uplink control information on the first data channel.

In some aspects, the UE is scheduled to transmit uplink control information on the first data channel, and the apparatus may receive the uplink control information on the second data channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
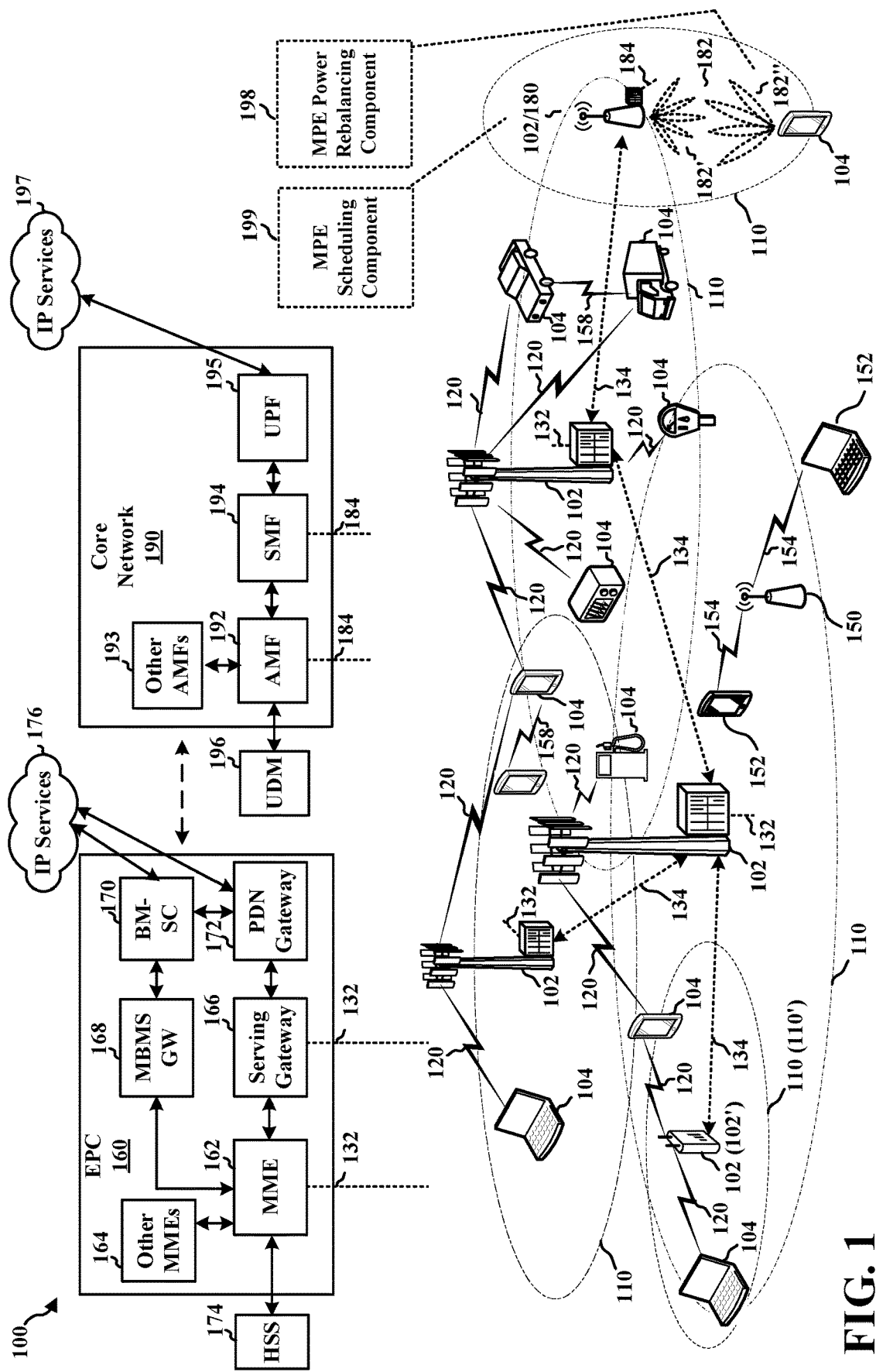
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., Si interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions.

The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a MPE power rebalancing component 198 configured to rebalance the transmit power applied to PUSCHs when a PUSCH is determined to be experiencing an MPE event. As described herein, an MPE event can be any radio frequency (RF) exposure event including, but not limited to, an event at which RF exposure is significantly less than any threshold defined by a commission, a standard, and/or other similar organizations. In certain aspects, the base station 180 may include a MPE scheduling component 199 configured to receive an MPE report indicating that an MPE event has occurred for a PUSCH and to change the scheduling of the PUSCH. As described herein, in some aspects, an MPE report, can be any RF exposure report indicating an RF exposure event has occurred for a data channel (e.g., PUSCH). Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
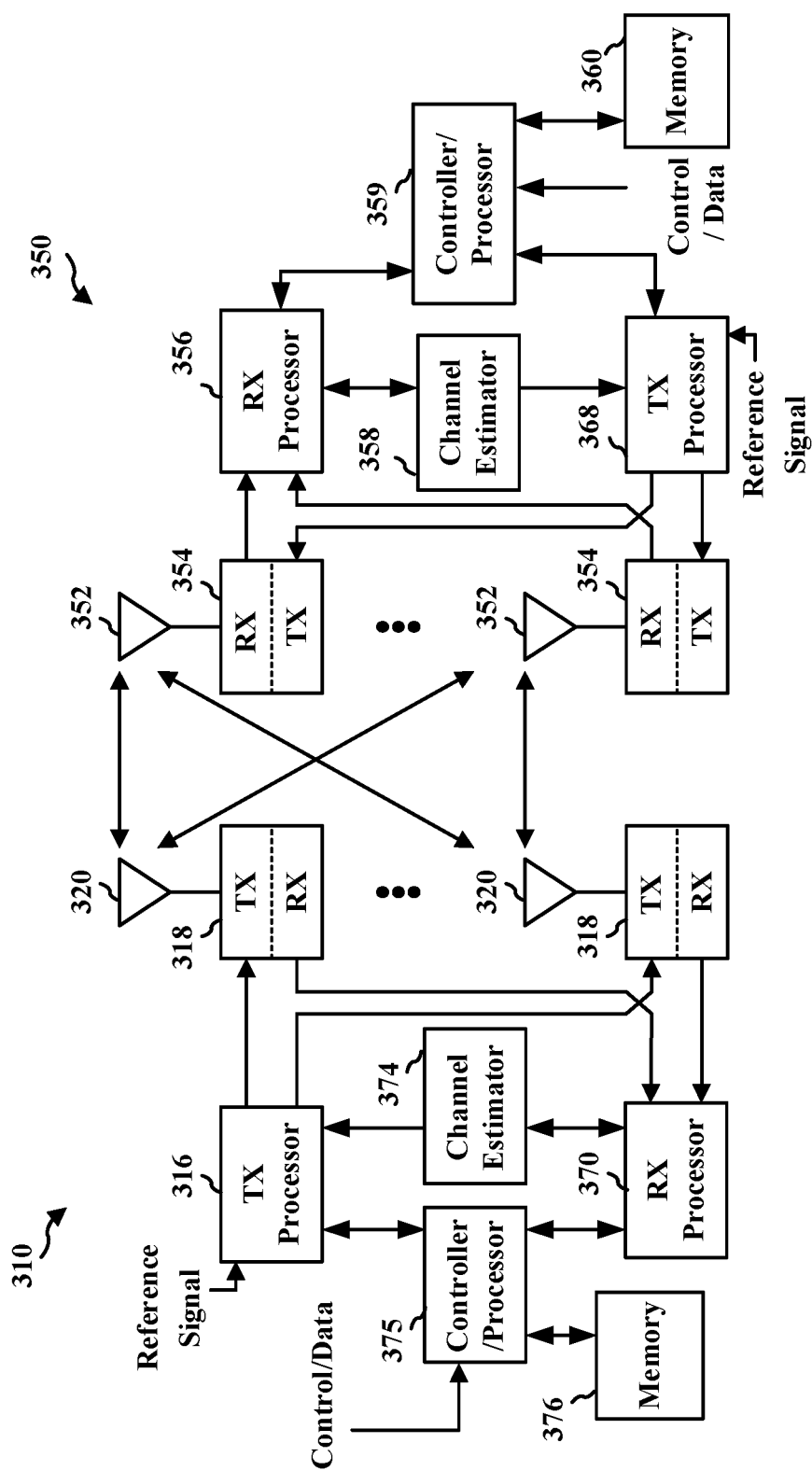
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Figure 4C:
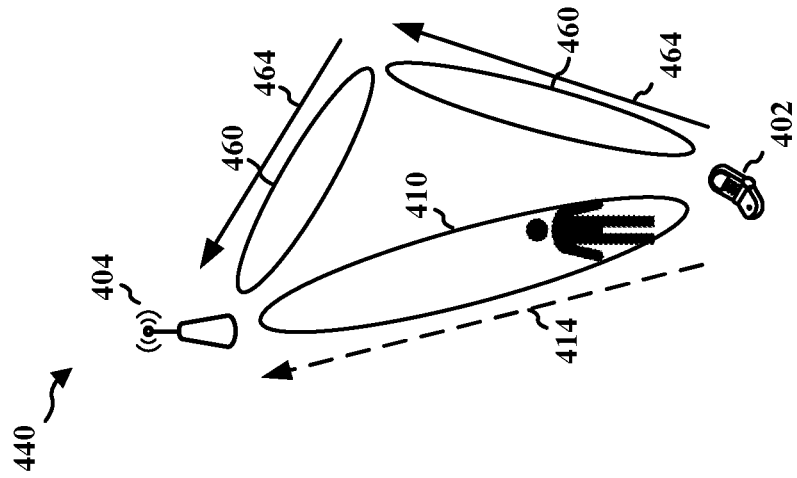
FIG. 4C is a diagram illustrating the base station and the UE utilizing a second beam to avoid an MPE event.
Figure 4B:
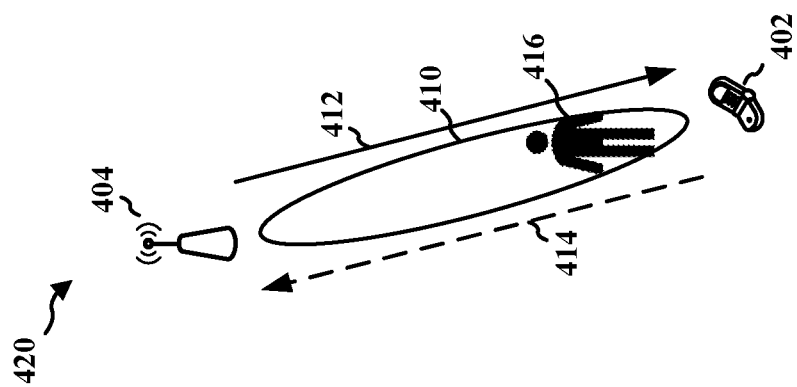
FIG. 4B is a diagram illustrating a maximum permissible exposure (MPE) event for an uplink on the beam.
Figure 4A:
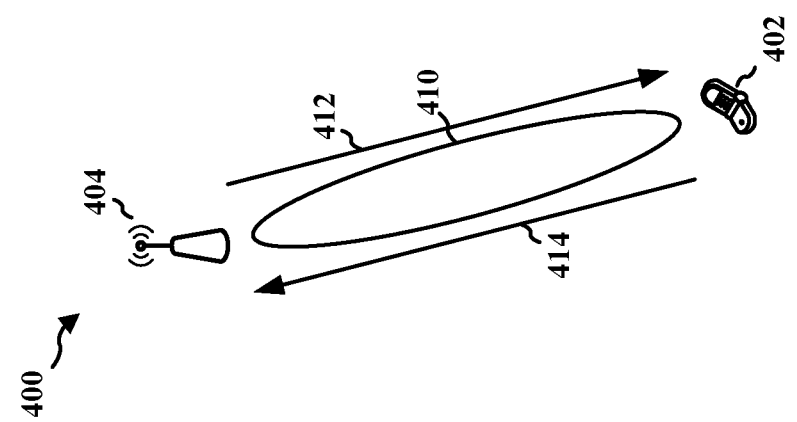
FIG. 4A is a diagram illustrating a base station and a UE communicating on a beam.

FIG. 4A is a diagram 400 illustrating a base station 404 and a UE 402 communicating on a beam 410. The base station 404 may transmit a downlink signal 412 to the UE 402 on the beam 410. The UE 402 may transmit an uplink signal 414 to the base station 404 on the same beam 410.

FIG. 4B is a diagram 420 illustrating a maximum permissible exposure (MPE) event for an uplink 414 on the beam 410. As described herein, an MPE event can be any radio frequency (RF) exposure event including, but not limited to, an event at which RF exposure is significantly less than any threshold defined by a commission, a standard, and/or other similar organizations. In order to avoid harm to a user, a UE may have a MPE. The MPE may define a maximum power for signals of some frequencies (e.g., RF frequencies) when the UE transmits the signal in the direction of a human body near the UE. As illustrated in FIG. 4B, a human body 416 is present in the beam 410 between the UE 402 and the base station 404. The base station 404 may still transmit the downlink signal 412 to the UE 402 on the beam 410. However, the uplink signal 414 may exceed the MPE for the UE 402. Accordingly, a MPE event has occurred. In the event of an MPE event, the UE 402 may not transmit the uplink signal 414 on the beam 410.

FIG. 4C is a diagram 440 illustrating the base station 404 and the UE 402 utilizing a second beam 460 to avoid an MPE event. The UE 402 and the base station 404 may communicate on both the beam 410 and a second beam 460. A human body is in the path of the beam 410 between the UE 402 and the base station 404, resulting in a MPE event for the beam 410. Accordingly, the UE 402 may not transmit the uplink signal 414 on the beam 410. The human body is not in the path of the second beam 460. Accordingly, transmission by the UE 402 on the second beam 460 may not result in an MPE event, and the UE 402 may transmit an uplink signal 464 to the base station 404 on the second beam 460.

Figure 5:
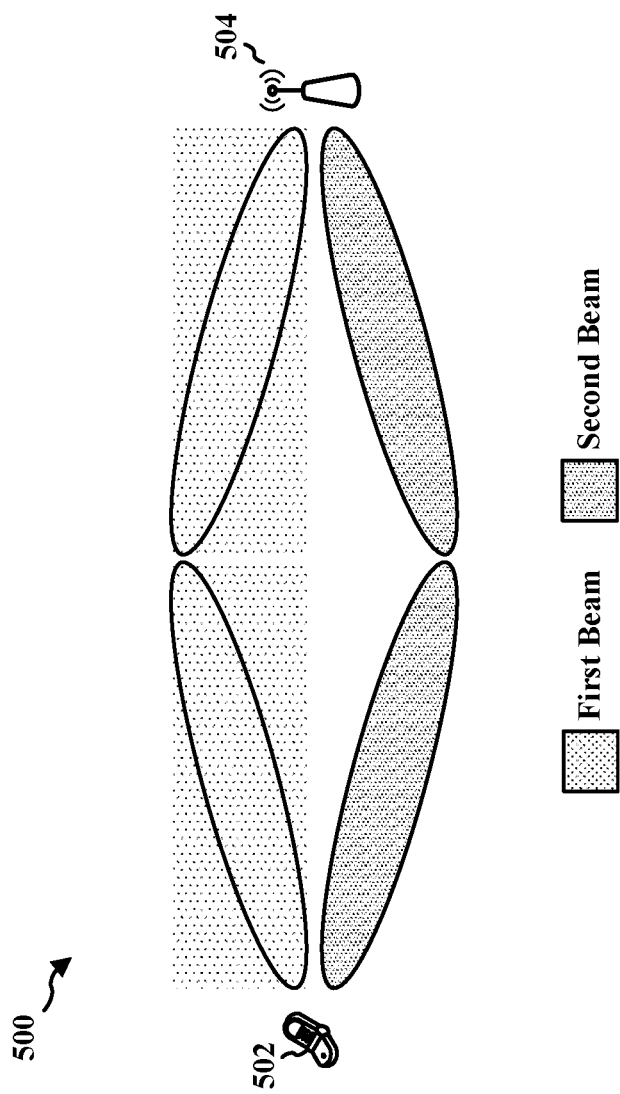
FIG. 5 is a diagram illustrating a base station and a UE communicating using multiple panel transmission.

FIG. 5 is a diagram 500 illustrating a base station 504 and a UE 502 communicating using multiple panel transmission. The UE 502 may include two panels. A panel may be a group of antennas. The UE 502 may communicate with a base station 504 using a first beam corresponding to the first panel, and may communicate with the base station 504 with a second beam corresponding to the second panel.

The UE 502 may transmit multiple PUSCHs to the base station 504 (that is, the UE 502 may simultaneously and/or contemporaneously transmit, to the base station 504, information on respective sets of resources configured for multiple PUSCHs). A first PUSCH may be transmitted to the base station 504 on the first beam utilizing the first panel. A second PUSCH may be transmitted to the base station 504 on the second beam utilizing the second panel. The first beam and second beam may be indicated by the respective transmission configuration indicator (TCI), which may be associated with a reference signal, such as CSI-RS or SRS.

Figure 6:
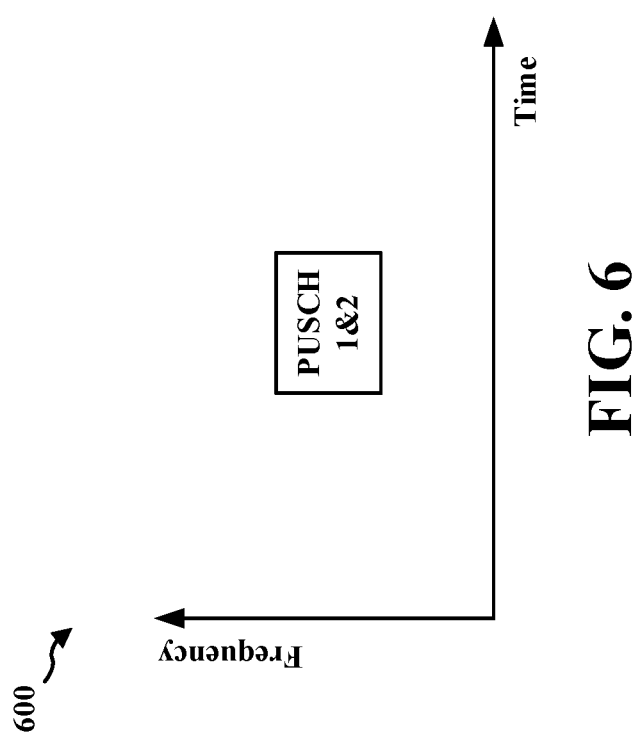
FIG. 6 is a graph illustrating multiple panel transmission with spatial division multiplexing.

The UE 502 may transmit the first PUSCH and the second PUSCH as illustrated in FIG. 6. FIG. 6 is a graph 600 illustrating multiple panel transmission with spatial division multiplexing. The first PUSCH and the second PUSCH may be scheduled for the same resources in the time and frequency domain. The UE 502 may transmit the first PUSCH and the second PUSCH simultaneously, and the base station 504 may discern the first PUSCH from the second PUSCH based on the beam on which the signal is received.

Figure 7:
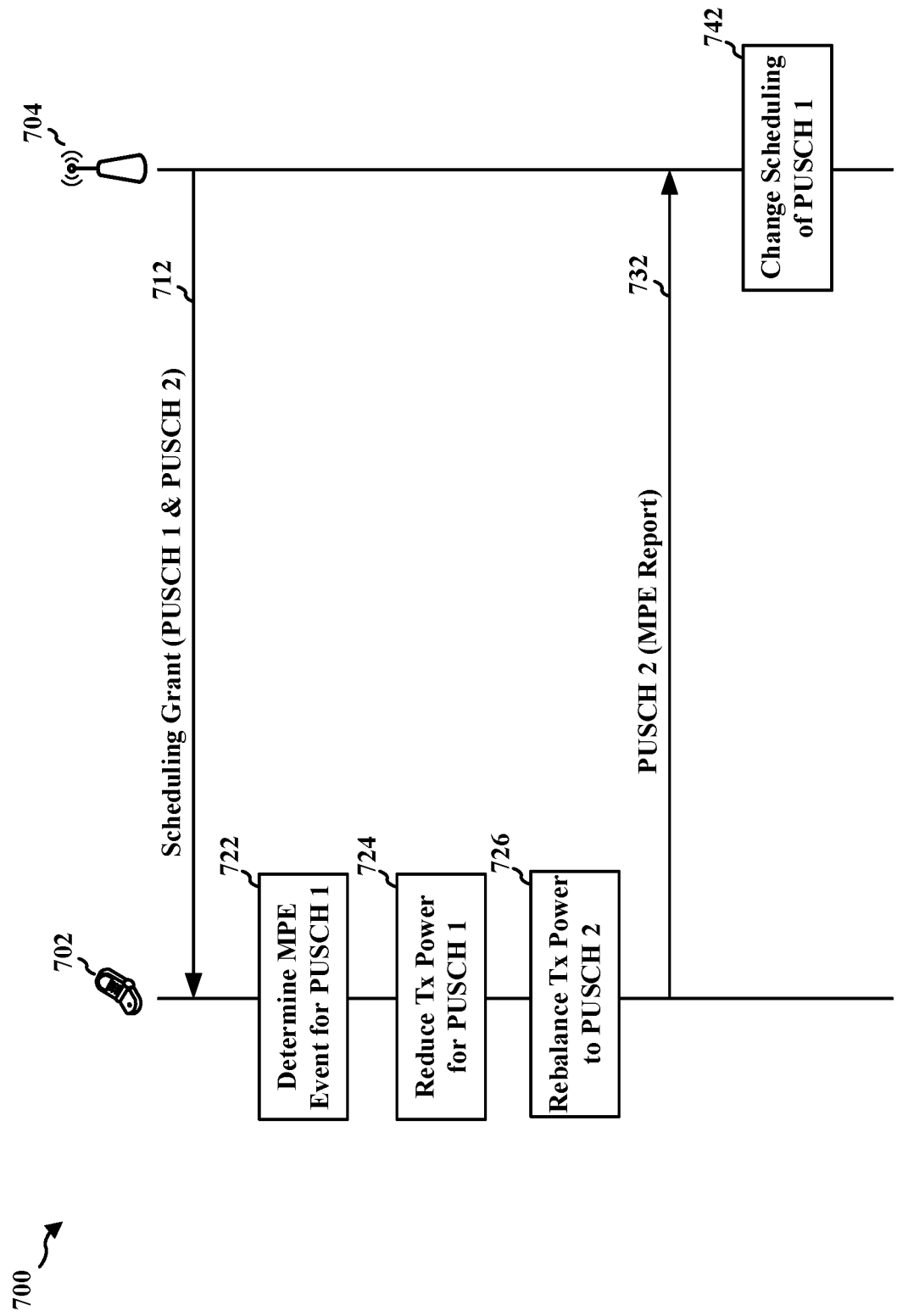
FIG. 7 is a communication flow diagram illustrating power rebalancing and MPE reporting in response to an MPE event.

FIG. 7 is a communication flow diagram 700 illustrating power rebalancing and MPE reporting in response to an MPE event. A UE 702 may communicate with a base station 704 utilizing a first beam and a second beam. For example, the UE 702 may include a first panel corresponding to the first beam and a second panel corresponding to the second beam, as described with respect to FIG. 5.

The base station 704 may schedule the UE 702 for simultaneous transmission of a first PUSCH and a second PUSCH. The first PUSCH may be scheduled to be transmitted on the first beam and the second PUSCH may be scheduled to be transmitted on the second beam. The base station 704 may transmit a scheduling grant 712 (e.g., in DCI) to the UE 702 identifying the resources scheduled for the first PUSCH and the second PUSCH. The scheduled transmit power for the first PUSCH and the scheduled transmit power for the second PUSCH may be referred to as an initial transmit power for that PUSCH.

As illustrated at 722, the UE 702 may determine that a MPE event has occurred for the first PUSCH. For example, the UE 702 may determine that a body is in proximity to the UE 702 and in the path of the first beam. The UE 702 may determine that the body is in proximity to the UE 702 and in the path of the beam using a sensor such as an ultrasound sensor or a millimeter wave signal. The UE 702 may then determine that transmitting the first PUSCH at the scheduled frequency band at the intended initial transmit power would exceed the MPE.

Upon determining that the MPE event has occurred, as illustrated at 724, the UE 702 may reduce the transmit power for the first PUSCH. For example, the UE 702 may reduce the power applied to an amplifier for a panel corresponding to the first beam. In some aspects, the UE 702 may reduce the transmit power by an amount less than the entire transmit power for the first PUSCH. The amount which the transmit power is reduced may be referred to as a power delta. The UE 702 may reduce the transmit power for the first PUSCH to a level which does not exceed the MPE. In some aspects, the UE 702 may reduce the transmit power for the first PUSCH to zero (e.g., may not transmit the first PUSCH).

The first PUSCH may include a set of symbols (e.g., QAM or QPSK symbols) scheduled to transmit UCI. In some aspects, the UE 702 may not reduce the transmit power for the set of symbols of the first PUSCH scheduled to transmit the UCI (e.g., may transmit the symbols of the first PUSCH carrying UCI at the initial transmit power), but may reduce the transmit power for the other symbols of the first PUSCH, such as the symbols scheduled to carry uplink data information.

In some aspects, the UCI that was scheduled to be transmitted on the first PUSCH may be remapped to be transmitted on the second PUSCH. For example, the UE 702 may be scheduled by DCI with the first PUSCH having two layers (e.g., layer index 0 and layer 1), and the second PUSCH having two layers (e.g., layer index 2 and layer 3). When there is no MPE event, the UCI may be mapped to a common set of symbols for all the layers (e.g., layer index 0, 1, 2, 3). However, when there is a MPE event, the UCI may be mapped to a new set of symbols of the second PUSCH only with the layer index 2 and 3, rather than the layer index 1 and 2. In this way, when reducing or dropping the transmit power of the first PUSCH, the part of UCI schedule to be transmitted on the first PUSCH are remapped to the second PUSCH, which may be less impacted or not impacted by the MPE.

As illustrated at 726, the UE 702 may rebalance the transmit power reduced from the first PUSCH at 724 to the second PUSCH. For example, the UE 702 may increase the power applied to an amplifier for a panel corresponding to the second beam. Increasing the transmit power of the second PUSCH may improve the reception of the second PUSCH by the base station 704. Where the transmit power of the first PUSCH is reduced by a power delta, the transmit power of the second PUSCH may be increased by the power delta. The transmit power of the second PUSCH may be the lower of the maximum transmit power for a panel transmitting the second PUSCH and the initial transmit power of the second PUSCH plus the power delta. Where the transmit power of the first PUSCH is reduced to zero, the UE 702 may increase the transmit power of the second PUSCH by the entire initial transmit power of the first PUSCH. The transmit power of the second PUSCH may be the lower of the maximum transmit power for a panel transmitting the second PUSCH and the initial transmit power of the second PUSCH plus the initial transmit power of the first PUSCH.

The UE 702 may transmit the second PUSCH 732 to the base station 704 at the new transmit power. The UE 702 may include a MPE report in the second PUSCH 732. The MPE report may be a media access control element (MAC-CE). The MPE report may include an indicator identifying the amount of the reduction of the transmit power of the first PUSCH. For example, the indicator may be a power management maximum power reduction (P-MPR) of the first PUSCH, may be the power delta of the first or second PUSCH, may be a power headroom report for the second PUSCH, or may be a combination thereof. In some aspects, the UE 702 may report the P-MPR or an UL RSRP for each beam which the UE 702 is utilizing to communicate with the base station 704 in the MPE report. The MPE report may also include an indicator identifying the first beam experiencing the MPE event. The indicator identifying the first beam may be an uplink beam identifier such as a scheduling request indicator, a PUCCH spatial relation identifier, or a SRS spatial relation reference signal; may be a spatial reference signal identifier such as a CSI-RS resource identifier or a synchronization signal block identifier; or may be an uplink resource identifier such as a PUCCH/SRS resource identifier or a SRS resource set identifier. The MPE report may include an indicator identifying the PUSCH which was dropped or for which the transmit power was reduced, e.g., may include an indicator identifying the first PUSCH. The MPE report may further indicate whether transmit power was rebalanced to the second PUSCH, and if so, the amount of power rebalanced to the PUSCH (e.g., may identify a power boosting value for demodulation reference signals of the second PUSCH). In some aspects, the MPE report may include a new beam pairing request, requesting that the UE 702 be paired with a new beam to replace the first beam which is experiencing the MPE event.

The base station 704 may receive the second PUSCH 732 and the MPE report. As illustrated at 742, the base station 704 may change the scheduling of the first PUSCH based on the MPE report. In some aspects, the base station 704 may not schedule the first PUSCH on the first beam in subsequent slots. In some aspects, such as where the MPE report includes a new beam pairing request, the base station 704 may determine a new beam to be paired with the UE 702, and may schedule the first PUSCH on the new beam in subsequent slots.

Figure 8:
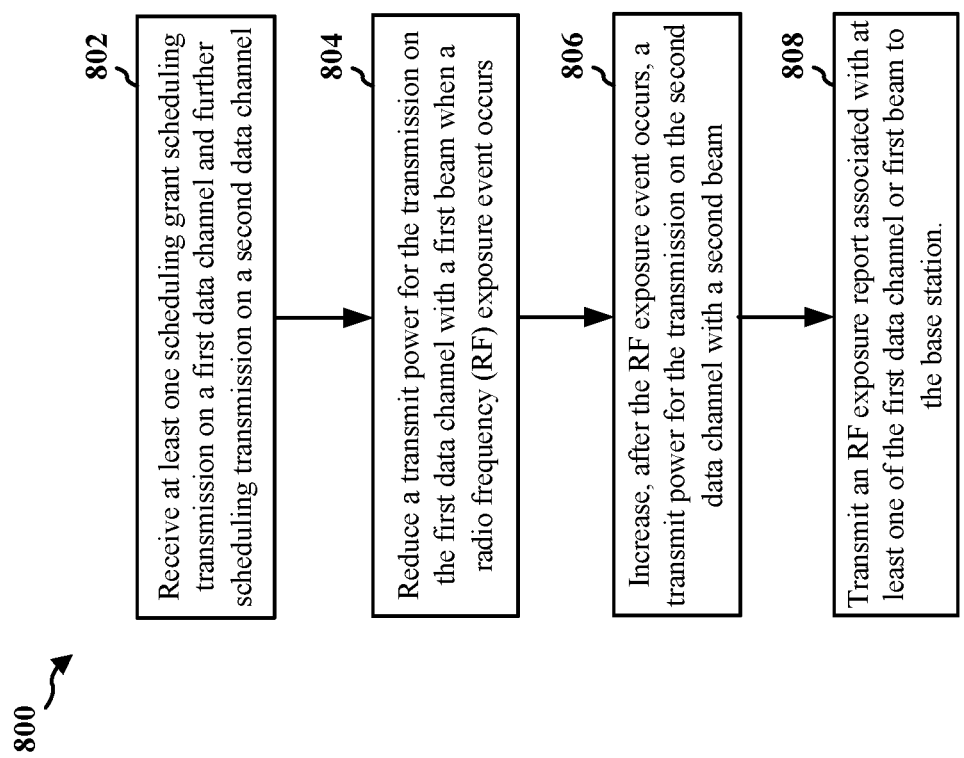
FIG. 8 is a flowchart of a method of wireless communication.

FIG. 8 is a flowchart 800 of a method of wireless communication. The method may be performed by a UE (e.g., the UE 104, 350, 502, 702; or a component of the UE 350, such as the TX processor 368, the RX processor 356, and/or the controller/processor 359) and/or other apparatus (e.g., the apparatus 1002).

At 802, the UE may receive, from a base station, at least one scheduling grant scheduling transmission on a first data channel (e.g., PUSCH) and further scheduling transmission on a second data channel (e.g., PUSCH). In the context of FIG. 7, for example, the UE 702 may receive, from the base station 704, the scheduling grant 712.

At 804, the UE may reduce a transmit power for the transmission on the first data channel with a first beam when a radio frequency (RF) exposure event (e.g., Maximum Permissible Exposure event) occurs. In the context of FIG. 7, for example, the UE 702 may reduce transmit power for first PUSCH at 724. In some aspects, the UE may determine whether an RF exposure event (e.g., MPE event) occurs by measuring RF exposure associated with communication using a first beam, comparing the RF exposure measurement to a threshold value, and determining whether the RF exposure measurement satisfies the threshold value. For example, if the RF exposure measurement satisfies the threshold value, then the UE may determine that an RF exposure event occurred. In some aspects, the UE may reduce a transmit power for the transmission on the first data channel (e.g., first PUSCH) with a first beam by identifying at least a portion of at least one antenna element associated with transmission on the first data channel (e.g., first PUSCH) when the RF exposure event occurs, and refraining from using the portion of the at least one antenna element for another transmission based on the identification. The transmit power of the first data channel (e.g., first PUSCH) may be reduced by a power delta, and wherein the transmit power of the second data channel (e.g., second PUSCH) is increased by the power delta. The power delta may be the entire transmit power for the first data channel (e.g., first PUSCH). Uplink control information scheduled on the first data channel (e.g., first PUSCH) may be remapped to the second data channel (e.g., second PUSCH). Uplink control information may be scheduled for uplink control information symbols of the first data channel (e.g., first PUSCH), and the transmit power for the uplink control information symbols of the first data channel (e.g., first PUSCH) may not be reduced when the RF exposure event (e.g., MPE event) occurs.

At 806, the UE may increase, after the RF exposure event (e.g., MPE event) occurs, a transmit power for the transmission on the second data channel (e.g., PUSCH) with a second beam. In the context of FIG. 7, the UE 702 may rebalance the transmit power reduced from the first PUSCH at 724 to the second PUSCH at 726. In some aspects, the UE may increase the transmit power for the transmission on the second data channel (e.g., second PUSCH) with a second beam by identifying at least a portion of at least one antenna element associated with transmission on the second data channel after the RF exposure event occurs, and increasing the power applied to an amplifier of at least the portion of the at least one antenna element associated with transmission on the second data channel.

At 808, the UE may transmit an RF exposure report (e.g., MPE report) associated with at least one of the first data channel or first beam to the base station. In some aspects, the RF exposure report may be transmitted to the base station on the second data channel using the second beam. The RF exposure report (e.g., MPE report) may be based on the reduction in transmit power for the first data channel (e.g., first PUSCH). The RF exposure report (e.g., MPE report) may be a MAC-CE. The RF exposure report (e.g., MPE report) may include an identifier of the amount of power reduction of the first data channel (e.g., first PUSCH) and an identifier of the first beam. The RF exposure report (e.g., MPE report) may include an identifier of the first data channel (e.g., first PUSCH). The RF exposure report (e.g., MPE report) may include an identifier of the amount of power increase of the second data channel (e.g., second PUSCH). The RF exposure report (e.g., MPE report) may include a request for the second beam to be paired with a new beam. In some aspects, the RF exposure report is transmitted to the base station on the second data channel (e.g., second PUSCH) using the second beam.

Figure 9:
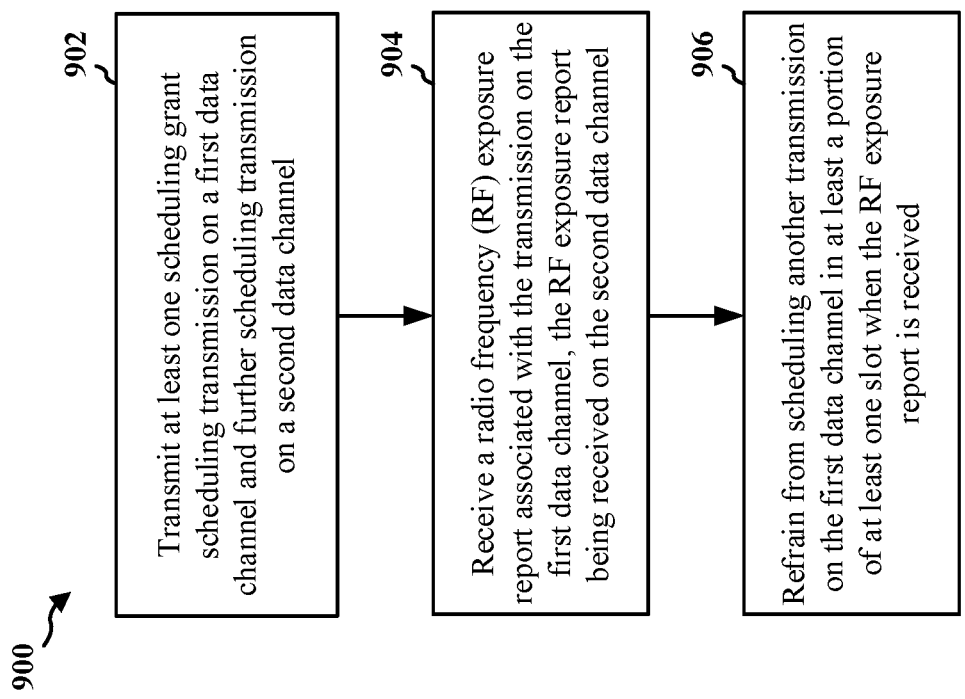
FIG. 9 is a flowchart of a method of wireless communication.

FIG. 9 is a flowchart 900 of a method of wireless communication. The method may be performed by a base station (e.g., the base station 102/180, 310, 504, 704; or a component of the base station 310, such as the TX processor 316, the RX processor 370, and/or the controller/processor 375) and/or other apparatus (e.g., the apparatus 1102).

At 902, the base station may transmit, to a UE, at least one scheduling grant scheduling transmission on a first data channel (e.g., PUSCH) and further scheduling transmission on a second data channel (e.g., PUSCH). In the context of FIG. 7, for example, the base station 704 may transmit, to the UE 702, the scheduling grant 712.

At 904, the base station may receive, from the UE, a radio frequency (RF) exposure report (e.g., Maximum Permissible Exposure report) associated with the transmission on the first data channel (e.g., first PUSCH). The RF exposure report (e.g., MPE report) may be received on the second data channel (e.g., second PUSCH). In the context of FIG. 7, for example, the base station 704 may receive, from the UE 702, the MPE report 732. The RF exposure report (e.g., MPE report) may be a MAC-CE. The RF exposure report (e.g., MPE report) may include an identifier of an amount of power reduction of the first PUSCH and an identifier of the first beam. The RF exposure report (e.g., MPE report) may include an identifier of the first data channel (e.g., first PUSCH). The RF exposure report (e.g., MPE report) may include an identifier of an amount of power increase of the second data channel (e.g., second PUSCH). The base station may schedule the second data channel (e.g., second PUSCH) in the next slot based on the amount of power increase of the second data channel (e.g., second PUSCH). The RF exposure report (e.g., MPE report) may include a request for the second beam to be paired with a new beam. The base station may transmit, to the UE, a scheduling grant scheduling the first data channel (e.g., first PUSCH) for a third beam.

The UE may be scheduled to transmit uplink control information on the first data channel (e.g., first PUSCH). In some aspects, the base station may receive the uplink control information on the first data channel (e.g., first PUSCH). In some aspects, the base station may receive the uplink control information on the second data channel (e.g., second PUSCH).

At 906, the base station may refrain from scheduling another transmission on the first data channel (e.g., first PUSCH) in at least a portion of at least one slot when the RF exposure report (e.g., MPE report) is received. In some aspects, when the RF exposure report is received, the base station may refrain from scheduling another transmission on the first data channel (e.g., first PUSCH) in at least the portion of the at least one slot by identifying the RF exposure information (e.g., MPE information) from the UE, and selecting a beam unassociated with an RF exposure event (e.g., MPE event).

Figure 10:
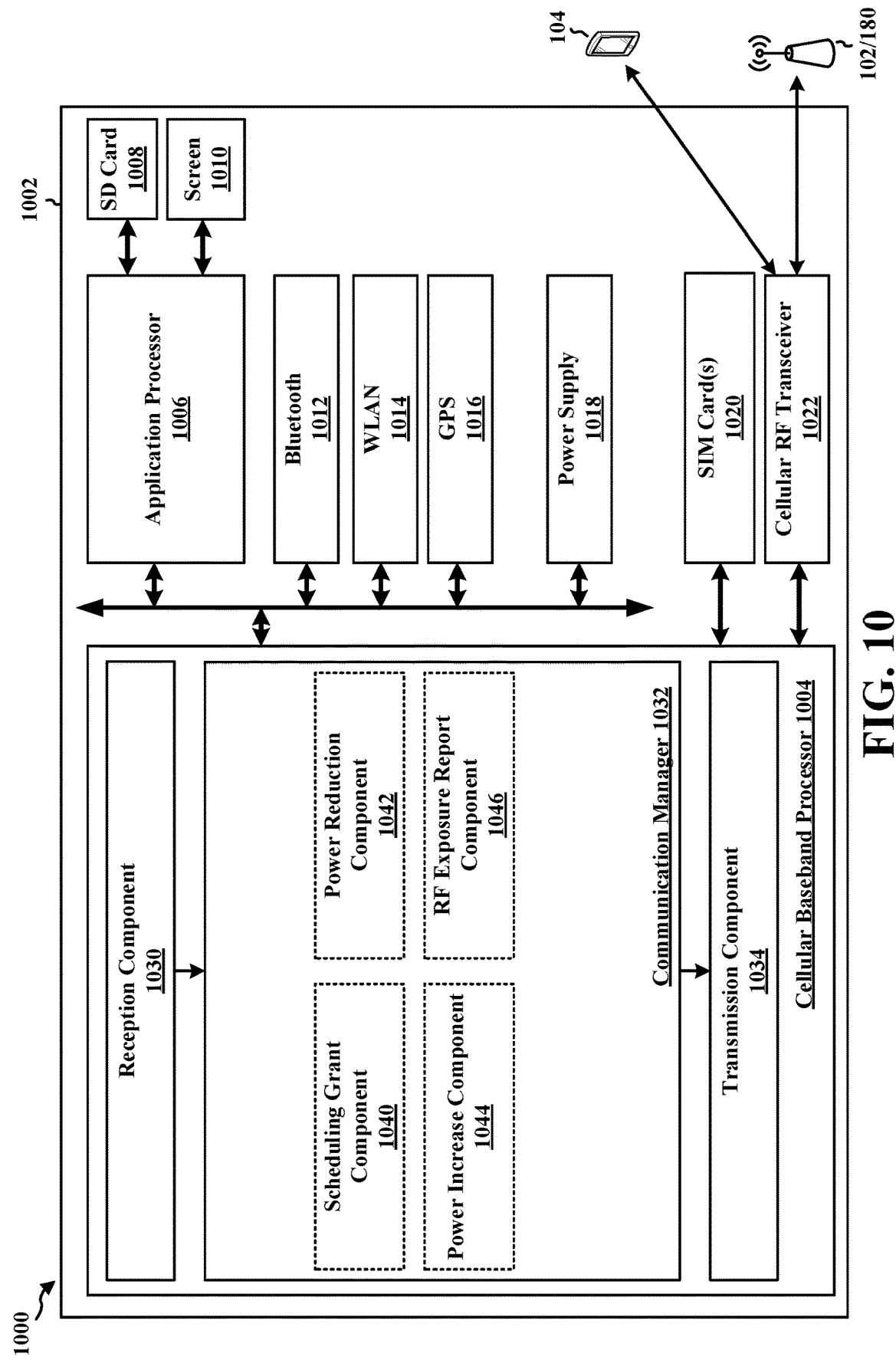
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or base station 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., the UE 350 of FIG. 3) and include the aforediscussed additional modules of the apparatus 1002.

The communication manager 1032 includes a scheduling grant component 1040 that is configured to receive, from a base station (e.g., the base station 102/180, 310, 504, 704; or a component of the base station 310, such as the TX processor 316, the RX processor 370, and/or the controller/processor 375) and/or other apparatus (e.g., the apparatus 1102), at least one scheduling grant scheduling transmission on a first data channel and further scheduling transmission on a second data channel, e.g., as described in connection with block 802 of FIG. 8. The communication manager 1032 further includes a power reduction component 1042 that receives input based on the at least one scheduling grant from the scheduling grant component 1040 and is configured to reduce a transmit power for the transmission on the first data channel with a first beam when a radio frequency (RF) exposure event occurs, e.g., as described in connection with block 804 of FIG. 8. The communication manager 1032 further includes a power increase component 1044 that receives input based on the reduction of the transmit power for the transmission on the first data channel with a first beam from the power reduction component 1042 and is configured to increase, after the RF exposure event occurs, a transmit power for the transmission on the second data channel with a second beam, e.g., as described in connection with block 806 of FIG. 8. The communication manager 1032 further includes an RF exposure report component 1046 that receives input based on the increased transmit power for the transmission on the second data channel with a second beam from the power increase component 1044 and is configured to transmit an RF exposure report associated with at least one of the first data channel or first beam to the base station, e.g., as described in connection with block 808 of FIG. 8.

The apparatus 1002 may include additional components that perform some or all of the blocks, operations, signaling, etc. of the algorithm(s) in the aforementioned flowchart(s) of FIG. 8. As such, some or all of the blocks, operations, signaling, etc. in the aforementioned flowchart(s) of FIG. 8 may be performed by a component and the apparatus 1002 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for means for receiving, from a base station, at least one scheduling grant scheduling transmission on a first data channel and further scheduling transmission on a second data channel; means for reducing a transmit power for the transmission on the first data channel with a first beam when a radio frequency (RF) exposure event occurs; means for increasing, after the RF exposure event occurs, a transmit power for the transmission on the second data channel with a second beam; and means for transmitting an RF exposure report associated with at least one of the first data channel or the first beam to the base station on the second data channel using the second beam.

In one aspect, the transmit power of the first data channel is reduced by a power delta. In one aspect, the transmit power of the second data channel is increased by the power delta.

In one aspect, the power delta is the entire transmit power for the first data channel.

In one aspect, uplink control information scheduled on the first data channel is remapped to the second data channel.

In one aspect, uplink control information is scheduled for uplink control information symbols of the first data channel. In one aspect, the transmit power for the uplink control information symbols of the first data channel is not reduced when the RF exposure event occurs.

In one aspect, the RF exposure report is based on the reduction in transmit power for the first data channel.

In one aspect, the RF exposure report is a media access control control element (MAC-CE).

In one aspect, the RF exposure report comprises an identifier of the amount of power reduction of the first data channel and an identifier of the first beam.

In one aspect, the RF exposure report comprises an identifier of the amount of power increase of the second data channel.

In one aspect, the RF exposure report comprises a request for the second beam to be paired with a new beam.

In one aspect, the RF exposure report is transmitted to the base station on the second data channel using the second beam.

The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
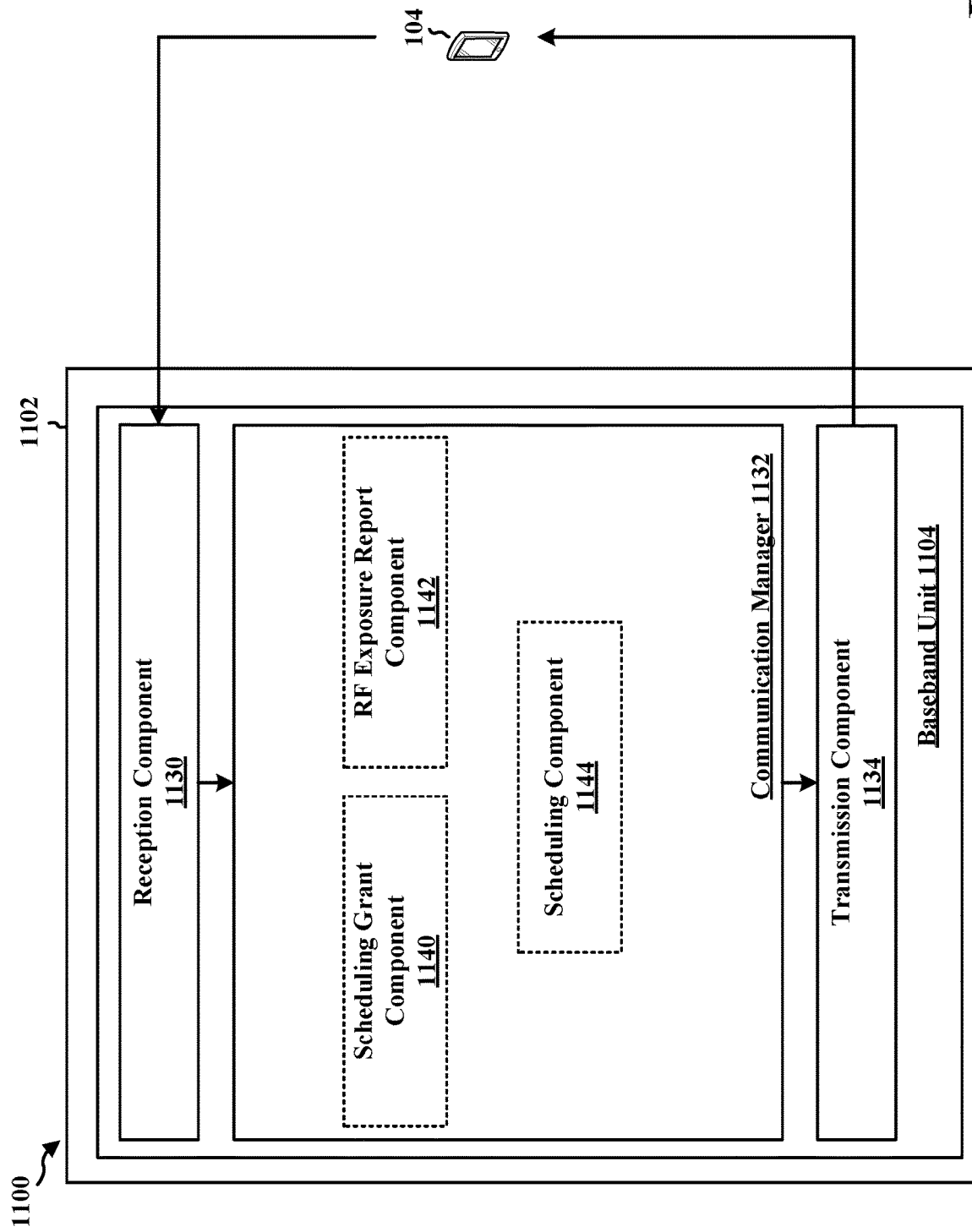
FIG. 11 is a diagram illustrating another example of a hardware implementation for another example apparatus.

FIG. 11 is a diagram 1100 illustrating an example of a hardware implementation for an apparatus 1102. The apparatus 1102 is a base station and includes a baseband unit 1104. The baseband unit 1104 may communicate through a cellular RF transceiver with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a scheduling grant component 1140 that is configured to transmit, to a user equipment (UE) (e.g., the UE 104, 350, 502, 702; or a component of the UE 350, such as the TX processor 368, the RX processor 356, and/or the controller/processor 359) and/or other apparatus (e.g., the apparatus 1002)), at least one scheduling grant scheduling transmission on a first data channel and further scheduling transmission on a second data channel, e.g., as described in connection with block 902 of FIG. 9. The communication manager 1132 further includes a RF exposure report component 1142 that is configured to receive, from the UE, a radio frequency (RF) exposure report associated with the transmission on the first data channel, the RF report being received on the second data channel, e.g., as described in connection with block 904 of FIG. 9. The communication manager 1132 further includes a scheduling component 1144 that receives input based on the RF exposure report from reception component 1142 and is configured to refrain from scheduling another transmission on the first data channel in at least a portion of at least one slot when the RF exposure report is received, e.g., as described in connection with block 906 of FIG. 9.

The apparatus 1102 may include additional components that perform some or all of the blocks, operations, signaling, etc. of the algorithm(s) in the aforementioned flowchart(s) of FIG. 9. As such, some or all of the blocks, operations, signaling, etc. in the aforementioned flowchart(s) of FIG. 9 may be performed by a component and the apparatus 1102 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for transmitting, to a user equipment (UE), at least one scheduling grant scheduling transmission on a first data channel and further scheduling transmission on a second data channel; means for receiving, from the UE, a radio frequency (RF) exposure report associated with the transmission on the first data channel, the RF exposure report being received on the second data channel; and means for refraining from scheduling another transmission on the first data channel in at least a portion of at least one slot when the RF exposure report is received.

In one aspect, the RF exposure report is a media access control control element (MAC-CE).

In one aspect, the RF exposure report comprises an identifier of an amount of power reduction of the first data channel and an identifier of the first beam.

In one aspect, the RF exposure report comprises an identifier of the first data channel.

In one aspect, the RF exposure report comprises an identifier of an amount of power increase of the second data channel, and the apparatus 1102, and in particular the baseband unit 1104, further includes means for scheduling the second data channel in the next slot based on the amount of power increase of the second data channel.

In one aspect, the RF report comprises a request for the second beam to be paired with a new beam, the method further comprising transmitting, to the UE, a scheduling grant scheduling the first PUSCH for a third beam.

In one aspect, the UE is scheduled to transmit uplink control channel on the first data channel, and the apparatus 1102, and in particular the baseband unit 1104, further includes means for receiving the uplink control information on the first data channel.

In one aspect, the UE is scheduled to transmit uplink control channel on the first data channel, and the apparatus 1102, and in particular the baseband unit 1104, further includes means for receiving the uplink control information on the second data channel.

The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving, from a base station, at least one scheduling grant scheduling transmission on a first data channel and further scheduling transmission on a second data channel;
   reducing a transmit power for the transmission on the first data channel with a first beam when a radio frequency (RF) exposure event occurs;
   increasing, after the RF exposure event occurs, a transmit power for the transmission on the second data channel with a second beam; and
   transmitting an RF exposure report associated with at least one of the first data channel or the first beam to the base station on the second data channel using the second beam,
   wherein uplink control information is scheduled for uplink control information symbols of the first data channel, and wherein the transmit power for the uplink control information symbols of the first data channel is not reduced in response to determining that the RF exposure event has occurred.

2. The method of claim 1, wherein the transmit power of the first data channel is reduced by a power delta, and wherein the transmit power of the second data channel is increased by the power delta.

3. The method of claim 2, wherein the power delta is the entire transmit power for the first data channel.

4. The method of claim 1, wherein uplink control information scheduled on the first data channel is remapped to the second data channel.

5. The method of claim 1, wherein the RF exposure report is a media access control control element (MAC-CE).

6. The method of claim 1, wherein the RF exposure report comprises an identifier of the amount of power reduction of the first data channel and an identifier of the first beam.

7. The method of claim 1, wherein the RF exposure report comprises an identifier of the first data channel.

8. The method of claim 1, wherein the RF exposure report comprises an identifier of the amount of power increase of the second data channel.

9. The method of claim 1, wherein the RF exposure report comprises a request for the second beam to be paired with a new beam.

10. The method of claim 1, wherein the RF exposure report is transmitted to the base station on the second data channel using the second beam.

11. An apparatus for wireless communication at a user equipment (UE), comprising:
    a memory; and
    at least one processor coupled to the memory and configured to:
      receive, from a base station, at least one scheduling grant scheduling transmission on a first data channel and further scheduling transmission on a second data channel;
      reduce a transmit power for the transmission on the first data channel with a first beam when a radio frequency (RF) exposure event occurs;
      increase, after the RF exposure event occurs, a transmit power for the transmission on the second data channel with a second beam; and
      transmit an RF exposure report associated with at least one of the first data channel or the first beam to the base station,
    wherein uplink control information is scheduled for uplink control information symbols of the first data channel, and wherein the transmit power for the uplink control information symbols of the first data channel is not reduced in response to determining that the RF exposure event has occurred.

12. The apparatus of claim 11, wherein the transmit power of the first data channel is reduced by a power delta, and wherein the transmit power of the second data channel is increased by the power delta.

13. The apparatus of claim 12, wherein the power delta is the entire transmit power for the first data channel.

14. The apparatus of claim 11, wherein uplink control information scheduled on the first data channel is remapped to the second data channel.

15. The apparatus of claim 11, wherein the RF exposure report being based on the reduction in transmit power for the first data channel.

16. The apparatus of claim 11, wherein the RF exposure report is a media access control control element (MAC-CE).

17. The apparatus of claim 11, wherein the RF exposure report comprises an identifier of the amount of power reduction of the first data channel and an identifier of the first beam.

18. The apparatus of claim 11, wherein the RF exposure report comprises an identifier of the first data channel.

19. The apparatus of claim 11, wherein the RF exposure report comprises an identifier of the amount of power increase of the second data channel.

20. The apparatus of claim 11, wherein the RF exposure report comprises a request for the second beam to be paired with a new beam.

21. A method of wireless communication at a base station, comprising:
    transmitting, to a user equipment (UE), at least one scheduling grant scheduling transmission on a first data channel and further scheduling transmission on a second data channel;

receiving, from the UE, a radio frequency (RF) exposure report associated with the transmission on the first data channel, the RF exposure report being received on the second data channel; and refraining from scheduling another transmission on the first data channel in at least a portion of at least one slot when the RF exposure report is received, wherein the RF exposure report comprises an identifier of an amount of power increase of the second data channel, the method further comprising scheduling the second data channel in the next slot based on the amount of power increase of the second data channel.

22. The method of claim 21, wherein the RF exposure report is a media access control control element (MAC-CE).

23. The method of claim 21, wherein the RF exposure report comprises an identifier of an amount of power reduction of the first data channel and an identifier of the first beam.

24. An apparatus for wireless communication at a base station, comprising:
- a memory; and
- at least one processor coupled to the memory and configured to:
  - transmit, to a user equipment (UE), at least one scheduling grant scheduling transmission on a first data channel and further scheduling transmission on a second data channel;
  - receive, from the UE, a radio frequency (RF) exposure report associated with the transmission on the first data channel, the RF exposure report being received on the second data channel; and
  - refrain from scheduling another transmission on the first data channel in at least a portion of at least one slot when the RF exposure report is received,
  - wherein the RF exposure report comprises an identifier of an amount of power increase of the second data channel, the processor being further configured to schedule the second data channel in the next slot based on the amount of power increase of the second data channel.

25. The apparatus of claim 24, wherein the RF exposure report is a media access control control element (MAC-CE).

* * * * *